United States Patent
Wensley

(12)
(10) Patent No.: US 6,479,190 B1
(45) Date of Patent: Nov. 12, 2002

(54) SEPARATOR FOR BATTERY HAVING ZINC ELECTRODE

(75) Inventor: C. Glen Wensley, Rock Hill, SC (US)

(73) Assignee: Celgard Inc., Charlotte, NC (US)

( * ) Notice: Subject to any disclaimer, the term of this patent is extended or adjusted under 35 U.S.C. 154(b) by 127 days.

(21) Appl. No.: 09/666,236

(22) Filed: Sep. 21, 2000

(51) Int. Cl.$^7$ ............................................... H01M 2/16
(52) U.S. Cl. ...................... 429/249; 429/144; 429/255; 429/248
(58) Field of Search ................................ 429/229, 249, 429/255, 250, 248, 144

(56) References Cited

U.S. PATENT DOCUMENTS

| | | | |
|---|---|---|---|
| 4,346,142 A | * 8/1982 | Lazear | 427/496 |
| 4,359,510 A | * 11/1982 | Taskier | 429/144 |
| 4,438,185 A | 3/1984 | Taskier | |
| 4,544,616 A | 10/1985 | Poa et al. | |
| 5,700,600 A | * 12/1997 | Danko et al. | 429/247 |
| 5,798,180 A | * 8/1998 | Chowdhury et al. | 428/411.1 |

OTHER PUBLICATIONS http://www.adk.co.jp/chemic–e/saa–em.htm.*

Clive D.S. Tuck, Editor, "Modern Battery Technology", Ellis Horwood Limited (England), (1991). No month.

David Linden, Editor, "Handbook of Batteries", 2nd ed., McGraw–Hill, Inc. (New York, NY), (1995). No month.

* cited by examiner

*Primary Examiner*—Carol Chaney
(74) *Attorney, Agent, or Firm*—Robert H. Hammer, III

(57) ABSTRACT

The instant invention is directed to a separator for a battery having a zinc electrode. The first embodiment of the separator comprises a microporous membrane and a coating on at least one surface of the membrane. The coating comprises a mixture of cellulose acetate and a surfactant. The surfactant has an active ingredient selected from the group of organic ethers. The second embodiment of the separator consists essentially of a microporous membrane having an effective average pore size of less than 0.045 microns, having a thickness less than 1.5 mils, having an electrical resistance of less or equal to 30 milliohms-inch$^2$, and being adapted for wetting by an aqueous electrolyte.

15 Claims, No Drawings

SEPARATOR FOR BATTERY HAVING ZINC ELECTRODE

FIELD OF THE INVENTION

This invention is directed to a separator for a battery having a zinc electrode.

BACKGROUND OF THE INVENTION

Batteries having zinc electrodes are known. See U.S. Pat. Nos. 4,359,510; 4,438,185; and 4,544,616; Tuck, C. D. S., Editor, *Modern Battery Technology,* Ellis Horwood Limited, Chichester, England (1991); and Linden, D., Editor, *Handbook Of Batteries,* Second Edition, McGraw-Hill, Inc., New York, N.Y. (1995), each of which is incorporated herein by reference. One such battery is the nickel-zinc (NiZn) battery (or cell).

While NiZn cells are well known, they have never reached significant commercial success; apparently, because the zinc electrode does not last long in rechargeable battery systems, and therefore, limits the effective cycle life of the battery. It has been suggested that microporous film could be used to overcome the problems associated with the use of zinc electrodes. See Tuck, Ibid., Linden, Ibid., and U.S. Pat. Nos. 4,359,510; 4,438,185; and 4,544,616.

One commercially available microporous membrane for use in batteries having zinc electrodes is Celgard® 3406 microporous membrane. See: U.S. Pat. Nos. 4,359,510 and 4,438,185. Celgard 3406 is a microporous membrane having a polymer coating on one surface. The microporous membrane is commercially available as Celgard® 2400 microporous membrane, a polypropylene microporous membrane having an average pore size of about 0.045 microns. The polymer coating consists of cellulose acetate and a surfactant commercially available as VICTAWET® 12 wetting agent. VICTAWET® 12 is commercially available from Akzo Chemicals, Inc., Chicago, Ill., and is an oxirane polymer with 2-ethylhexyl dihydrogen phosphate. While Celgard 3406 performs adequately, it has a limited shelf life (about 9 months from the coating date) and it wets only once (i.e., the surfactant readily washes off).

Accordingly, there is a need for an improved separator for a battery having a zinc electrode which has a greater shelf life, has a greater re-wet capability, and is able to extend the cycle life of the rechargeable battery having a zinc electrode.

SUMMARY OF THE INVENTION

The instant invention is directed to a separator for a battery having a zinc electrode. The first embodiment of the separator comprises a microporous membrane and a coating on at least one surface of the membrane. The coating comprises a mixture of cellulose acetate and a surfactant. The surfactant has an active ingredient selected from the group of organic ethers. The second embodiment of the separator consists essentially of a microporous membrane having an effective average pore size of less than 0.045 microns, having a thickness less than 1.5 mils, having an electrical resistance of less or equal to 20 milliohms-inch$^2$, and being adapted for wetting by an aqueous electrolyte.

DETAILED DESCRIPTION OF THE INVENTION

The instant invention is a separator for use in batteries having a zinc electrode. Those batteries are typically secondary (i.e., rechargeable) batteries. Such batteries may be nickel-zinc or silver-zinc batteries. To facilitate the following discussion, the battery discussed in detail will be a nickel-zinc battery. The invention, however, is not so limited.

The chemistry of nickel-zinc batteries is well known. See: Tuck, Ibid. and Linden, Ibid., both of which are incorporated herein by reference. Typically, the electrolyte used in such systems is an aqueous potassium hydroxide (KOH) solution, where the potassium hydroxide concentration ranges from about 20 to 45 percent by weight. A typical battery includes a nickel electrode, a zinc electrode, an electrolyte, and a separator, for example, a microporous membrane. Typically, the electrodes sandwich the separator, and the electrolyte communicates with the two electrodes via the separator.

The separator according to the instant invention has two embodiments. Generally, the first embodiment is directed to a coated separator, and the second embodiment is a non-coated separator. Each embodiment will be discussed, in turn, below. Preferably, each of the following separators has an electrical resistance less than or equal to 30 milliohms-inch$^2$ in aqueous 31% KOH, more preferred, the separators have electrical resistances $\leq$20 milliohms-inch$^2$ in an aqueous 31% KOH, and most preferably, in the range of about 10–12 milliohms-inch$^2$ in aqueous 31% KOH. The electrical resistance (or resistivity) is measured as follows: A R.A.I. AC Milliohm Resistance Meter, Model 2401 and R.A.I. test cell electrode (from RAI Research Corp., Hauppauge, N.Y.) is used. A 31% by weight KOH solution is used to wet the sample (samples should be soaked in solution for 8 to 24 hours before testing). Samples should not be dry when tested. Three samples of material are tested and averaged. The results, reported in milliohm-inch$^2$, may then be divided by the material thickness and reported as ohm-inches per mil.

The first embodiment is the coated separator. This separator comprises a microporous membrane and a coating on at least one surface of the membrane. The surfactant has an active ingredient selected from the group consisting of organic ethers. Each of the foregoing components will be discussed in greater detail below.

The microporous membrane is typically a hydrophobic, polyolefinic polymer. The hydrophobic, polyolefinic polymers include, for example, polyethylene and polypropylene, the latter is preferred. The method of manufacturing the membrane is not critical, and may include, for example, the "dry" stretch (or Celgard) process or the "solvent" stretch (or phase inversion) process. Such membranes may have thicknesses less than 3 mils (about 75 microns), preferably less than 1.5 mils (38 microns), and most preferably a thickness of about 1 mil (25 microns). The membrane may have an average pore size of about 0.045±0.002 micron, a porosity of 28–40%, and a Gurley of 20–45 sec/inch$^2$. Such membranes are commercially available from, for example, Celgard Inc., Charlotte, N.C., U.S.A.; Tonen K.K., Tokyo, Japan; Asahi Chemical Co., Tokyo, Japan; Ube Industries, Tokyo, Japan; and Nitto Denko Corporation, Tokyo, Japan.

The coating is applied to at least one surface of the membrane. If applied to one surface, the coating surface density may range from about 0.12 to 0.80 milligrams/cm$^2$, and preferably, the surface density may range from 0.25 to 0.45 milligrams/cm$^2$. The coating is preferably applied in solution and the solvent (e.g., acetone or methylethyl ketone) is driven off in any known manner. The effective average pore size of the coated separator should be less than 0.045 micron, preferably in the range of about 0.030 to 0.040 micron, and most preferably less than 0.035 micron. An effective average pore size which is too large will adversely impact cycle life because too many zinc ions will pass through the separator, and if too low, will adversely impact conductivity within the cell because electrical resistance will be too great. The effective average pore size refers to the apparent pore size exhibited by the coated membrane when wet out by the electrolyte. Effective average pore size is measured by solute passage method. See for example: Cheryan, M., *Ultrafiltration Handbook,* Technomic Publishing Co., Lancaster, Pa., (1986) p. 62–71. The pore size of a membrane was estimated to be 0.035 micron (35 nm) by the foregoing method using: myoglobulin—17,600 molecular weight (MW), 3.7 nanometers (nm) size, 0% rejection; lactoglobulin—38,000 MW, 5.2 nm, 10%; albumin—69,000 MW, 6.4 nm, 30%; serum globulin—148,000 MW, 9.2 nm, 75%; haemocyanine (Palinurus)—450,000 MW, 11.7 nm, 90%.

The coating comprises a mixture of cellulose acetate and surfactant. The cellulose acetate (which has about 2.5 acetyl groups per glucose, e.g. CA-398-3)) is a commercially available material from, for example, Celanese Acetate LLC of Charlotte, N.C., U.S.A.; or Eastman Chemical Co. of Kingsport, Tenn., U.S.A. Celanese cellulose acetate HB-105 is preferred.

With regard to the surfactant, three considerations help define the selection criteria, those considerations are: 1) the surfactant must be inert to the electrolyte (e.g. non hydrolyzable in the electrolyte); 2) the surfactant should not be soluble or readily soluble in the electrolyte; and 3) the surfactant should be adherent to the membrane (i.e. not easily washed from the membrane). One surfactant meeting the foregoing criteria has an active ingredient selected from the group consisting of organic ethers. One example of the organic ether is nonylphenoxypoly(ethyleneoxy)ethanol. One such surfactant is commercially available under the tradename IGEPAL CO-530 from Rhone-Poulenc of Cranbury, N.J., U.S.A.

In choosing the amounts of cellulose acetate and surfactant components of the coating, the following considerations are made: with regard to the cellulose acetate, a sufficient amount to coat the surface to create the sieve effect (i.e. ability to selectively pass/reject molecules based upon size) when wetted, but too much will block pores and increase the electrical resistance; and with regard to the surfactant, a sufficient amount to wet out the electrolyte, but too much will block pores. The cellulose acetate component of coating may range from about 0.02 mg/cm$^2$ to 0.30 mg/cm$^2$ preferably, 0.05 to 0.15 mg/cm$^2$, and the surfactant (i.e. IGEPAL) may range from about 0.10 to 0.50 mg/cm$^2$ preferably, 0.20 to 0.30 mg/cm$^2$.

The second embodiment is the non-coated separator (i.e., no cellulose acetate coating). This separator consists essentially of a microporous membrane having an effective average pore size of less than 0.045 microns and being adapted for wetting by an aqueous electrolyte. Each of the foregoing components will be discussed in greater detail below.

The microporous membrane is typically a hydrophobic, polyolefin polymer. Such polymers include, for example, polyethylene, and polypropylene, the latter is preferred. The method of manufacturing the membrane is not critical, and may include, for example, the "dry" stretch (or Celgard) process of the "solvent" stretch (or phase inversion) process. Such membranes have a thickness of about 1.5 mils (38 microns) or less. Such membranes are free of the coating because the effective average pore size is such that it inhibits the flow of the electrolyte's zinc ions in the active battery across the separator. The effective average pore size should be less than 0.045 micron, preferably less than 0.035 micron, and most preferably in the range of 0.020 to 0.040 micron. An effective average pore size which is too large will adversely impact cycle life because too many zinc ions will pass through the separator, and if too low, will adversely impact conductivity within the cell because electrical resistance will be too great. The wetting aspect of this embodiment involves modifying the surface with a surfactant (e.g. wetting agent). The surfactant has an active ingredient selected from the group consisting of organic ethers. One example of this organic ether is nonylphenoxypoly (ethyleneoxy)ethanol. One such surfactant is commercially available under the tradename IGEPAL CO-530 from Rhone-Poulenc of Cranbury, N.J., U.S.A. In choosing the amount of surfactant, the following considerations are made: a sufficient amount to wet out the electrolyte, but too much will block pores. The surfactant (i.e. IGEPAL) may range from about 0.10 to 0.50 mg/cm$^2$, preferably 0.20 to 0.30 mg/cm$^2$.

EXAMPLES

The separator made according to the instant invention was compared to the commercially available product Celgard® 3406 microporous membrane. The coating solution of the inventive separator included, on a weight of solvent basis, 3.5% cellulose acetate and 8% IGEPAL CO-530, and methyl ethyl ketone was the solvent. Results of the comparison are set out below:

TABLE

|  | 3406 | Invention |
|---|---|---|
| Surfactant durability | 9 months from coating date | 18 months from coating date |
| Wettability performance | wets once, fails to rewet after drying | wets repeatedly >5 times |

The present invention may be embodied in other specific forms without departing from the spirit or essential attributes thereof and, accordingly, reference should be made to the appended claims rather than to the foregoing specification, as indicating the scope of the invention.

What is claimed is:

1. A battery separator comprising:
   a microporous membrane and
   a coating on at least one surface of said membrane, said coating comprising a mixture of 16–38 weight % cellulose acetate and 62–84 weight % surfactant, said surfactant having an active ingredient selected from the group consisting of organic ethers.

2. The separator according to claim 1 having an effective average pore size less than 0.045 micron.

3. The separator according to claim 1 wherein said cellulose acetate has about 2.5 acetyl groups per glucose.

4. The separator according to claim 1 wherein said coating has a surface density of about 0.12 to 0.80 milligrams/cm$^2$.

5. The separator according to claim 1 having an electrical resistance of $\leq 30$ milliohms-inch$^2$.

6. The separator according to claim 5 wherein said electrical resistance ranges from 10–12 milliohms-inch$^2$.

7. A battery having a zinc electrode comprising
   a first electrode;
   a second electrode;
   an electrolyte; and a separator according to claim 1, said separator being disposed between said first electrode and said second electrode and said electrolyte being in communication with said electrodes via said separator.

8. A battery separator consisting essentially of a microporous membrane having an effective average pore size of less than 0.045 microns, a thickness less than 1.5 mils, an electrical resistance less than or equal to 30 milliohms-inch$^2$ and being adapted for wetting by an aqueous electrolyte.

9. The battery separator of claim 8 wherein said pore size ranges from 0.020 to 0.040 microns.

10. The battery separator of claim 8 wherein said pore size is less than 0.035 microns.

11. The battery separator of claim 8 wherein said electrical resistance ranges from 10–12 milliohms-inch$^2$.

12. The battery separator of claim 8 wherein said membrane being adapted for wetting further comprising a coating of a surfactant having an active ingredient being selected from the group consisting of organic ethers on said membrane.

13. The battery separator of claim 12 wherein said ingredient being nonylphenoxypoly(ethyleneoxy)ethanol.

14. A battery having a zinc electrode comprising a first electrode;

a second electrode being made of zinc;

an electrolyte; and a separator according to claim 8, said separator being disposed between said first electrode and said second electrode, and said electrolyte being in communication with said electrodes via said separator.

15. A battery separator comprising;

a microporous membrane and a coating on at least one surface of said membrane, said coating comprising cellulose acetate and a surfactant, said surfactant having an active ingredient of nonylphenoxypoly(ethyleneoxy)ethanol.

* * * * *